United States Patent [19]

Mortensen

[11] Patent Number: 4,645,461

[45] Date of Patent: Feb. 24, 1987

[54] METHOD FOR STRUCTURALLY DIFFERENTIATING POLYNOMIAL FUNCTIONS

[75] Inventor: Vernon J. Mortensen, Coeur d'Alene, Id.

[73] Assignee: Mortensen Educational Products, Inc., Chatsworth, Calif.

[21] Appl. No.: 825,141

[22] Filed: Jan. 30, 1986

[51] Int. Cl.⁴ .............................................. G09B 19/02
[52] U.S. Cl. .................................... 434/188; 434/208; 434/211
[58] Field of Search ............... 434/188, 208, 195, 211, 434/187

[56] References Cited

U.S. PATENT DOCUMENTS

| 205,960 | 7/1878 | Hill | 434/211 |
|---|---|---|---|
| 209,385 | 10/1878 | Davis | 434/211 |
| 3,208,162 | 9/1965 | Wisdom | 434/211 |
| 3,858,332 | 1/1975 | Rasmussen | 434/211 |
| 4,257,175 | 3/1981 | Wentworth | 434/208 |
| 4,332,567 | 1/1982 | Nogues | 434/195 |
| 4,504,234 | 3/1985 | Jarvis | 434/188 |

FOREIGN PATENT DOCUMENTS

| 493701 | 6/1950 | Belgium | 434/211 |
|---|---|---|---|
| 1031507 | 3/1953 | France | 434/211 |

Primary Examiner—William H. Grieb
Attorney, Agent, or Firm—Wells, St. John & Roberts

[57] ABSTRACT

Disclosed are methods for structurally differentiating polynomial functions using parallelogrammic elements. The methods include representing a first ordered pair defined by the polynomial function as a construction of such structural elements. Second or sequent sets are also similarly constructed for an ordered pair defined by a different variable value. The resulting structural sets are compared to determine differences and the differential is expressed either directly or after dividing by the associated change in the variable of the polynomial function used to construct the two or more sets of elements.

8 Claims, 24 Drawing Figures

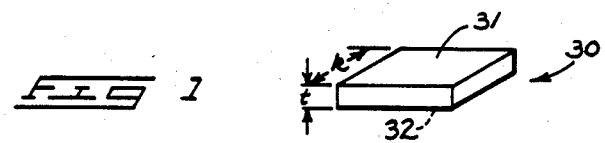
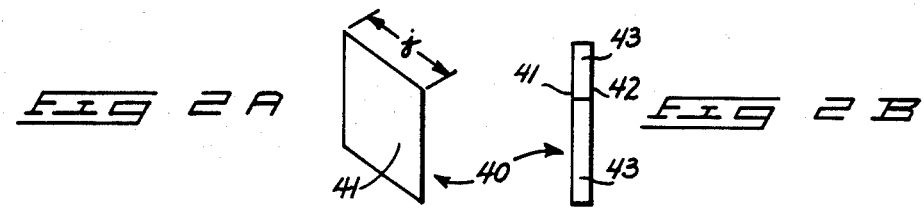
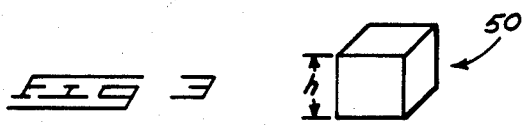
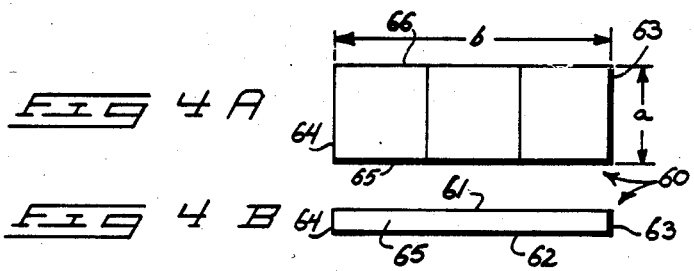
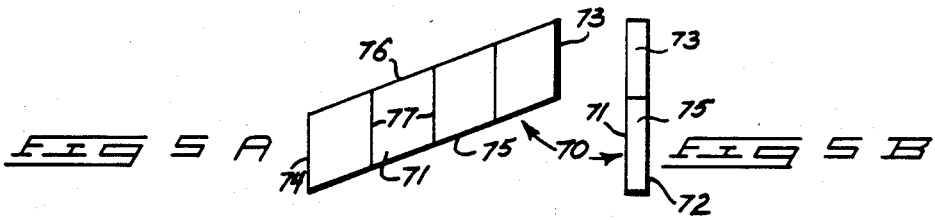
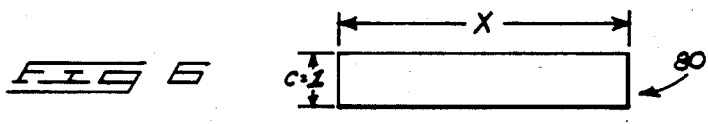

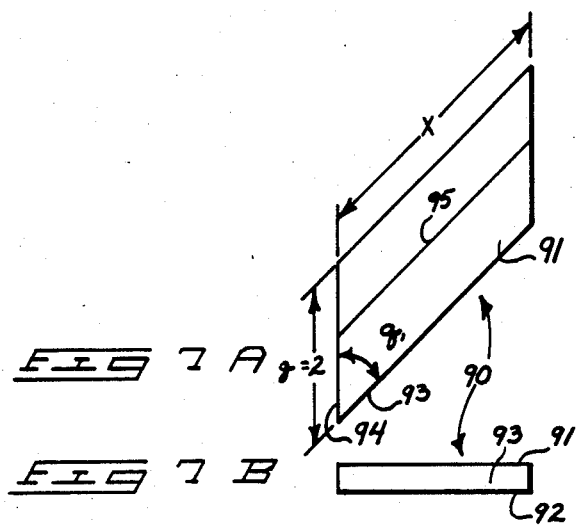
FIG 7A
FIG 7B
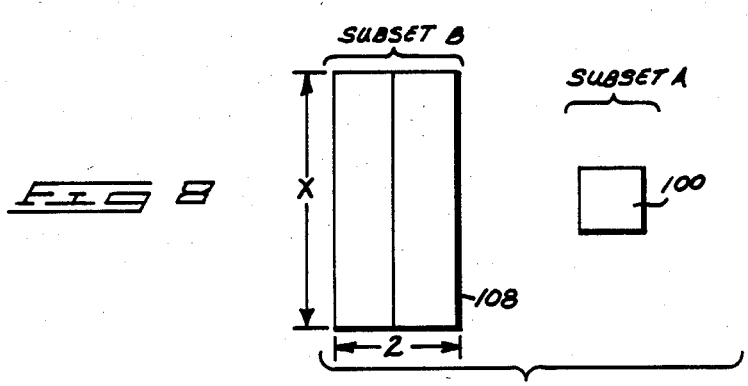
FIG 8
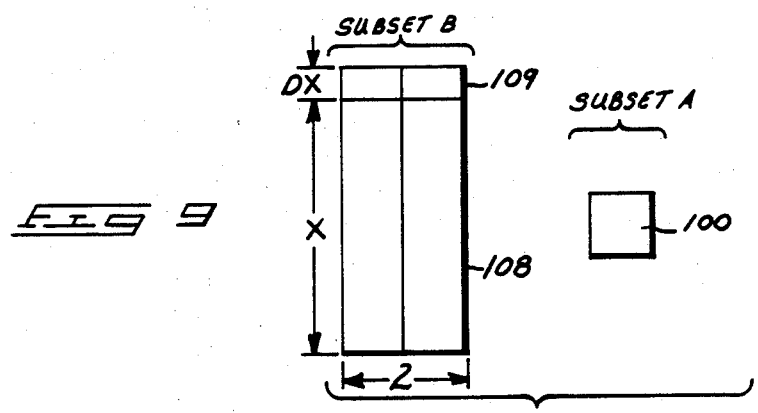
FIG 9

METHOD FOR STRUCTURALLY DIFFERENTIATING POLYNOMIAL FUNCTIONS

TECHNICAL FIELD

The technical field of this invention is methods for performing mathematical differentiation of polynomial functions using parallelogrammic structural elements which are arranged into structural sets and subsets to indicate the solution being sought.

BACKGROUND OF THE INVENTION

Current methods for determining the mathematical derivative of first, second and higher order polynomial functions typically involve purely mathematical problem solving techniques. Such prior art methods typically require that the exponent of the variable be multiplied times the coefficient of the same factor of the polynomial, and that the variable exponent be decreased by one. An example of prior art mathematical differential methods can be illustrated by the following equation:

$$f(x) = 4x^2 + 2x + 1$$

with the derivative being:

$$d(f(x))/dx[ = 4(2)x^{2-1} + 2x^{1-1}$$

$$d(f(x))/dx = 8x + 2$$

Such purely mathematical methods for performing differentiation are well recognized and widely practiced. They are, however, limited in that a person initially learning to mathematically differentiate typically cannot see the relationship between such operations and the underlying concepts of the polynomial expression and the purpose for such operations. Such purely mathematical methods for differentiation also fail to provide a method for differentiating which involves manipulation of structural elements. Nor do such prior art techniques provide methods employing structural elements which are highly illustrative of mathematical relationships, tactile in nature, and extremely helpful in both structurally solving the problems and in illustrating the process being performed.

BRIEF DESCRIPTION OF THE DRAWINGS

The drawings included herewith illustrate practice of preferred methods according to this invention. Included are the following:

FIG. 1 is a perspective (isometric) view showing a single exemplary unit parallelogrammic structural element useful in practicing methods of this invention;

FIG. 2A is a top view showing an alternative obliquely angled unit parallelogrammic structural element useful in the methods of this invention; the parallelogrammic unit is obliquely angled with respect to only one plane;

FIG. 2B is a side elevational view of the parallelogrammic structural element of FIG. 2A;

FIG. 3 is a perspective view showing a three-dimensionally representative parallelogrammic structural element;

FIG. 4A is a top view of a rectangularly shaped parallelogrammic element designated as having three parallelogrammic unit values;

FIG. 4B is a front elevational view of the parallelogrammic structural element of FIG. 4A;

FIG. 5A is a top view of an oblique parallelogrammic element having four designated parallelogrammic unit values;

FIG. 5B is a side elevational view of the oblique parallelogrammic element of FIG. 5A;

FIG. 6 is a top view of a rectangular shaped parallelogrammic element having an undesignated number of parallelogrammic unit values, useful for representing undesignated values of the function variable being differentiated;

FIG. 7A is a top view of an oblique parallelogrammic element having a width of two parallelogrammic unit values and a length with an undesignated number of parallelogrammic unit values, useful for representing an independent variable with coefficient of two (2) and an undefined variable value represented by the undesignated length of the parallelogrammic element;

FIG. 7B is a front elevational view of the oblique parallelogrammic element of FIG. 7A;

FIG. 8 is a top view of a set of rectangular parallelogrammic structural elements arranged to structurally represent the first order polynomial function, $f(x) = 2x + 1$; the variable x has been arbitrarily assigned a value X, indicating an undesignated length.

FIG. 9 is a top view of the set shown in FIG. 8 with additional structural elements arranged therewith to indicate an incremental increase DX in the value of the polynomial independent variable, x;

DETAILED DESCRIPTION OF THE PREFERRED EMBODIMENT

Figure 10:
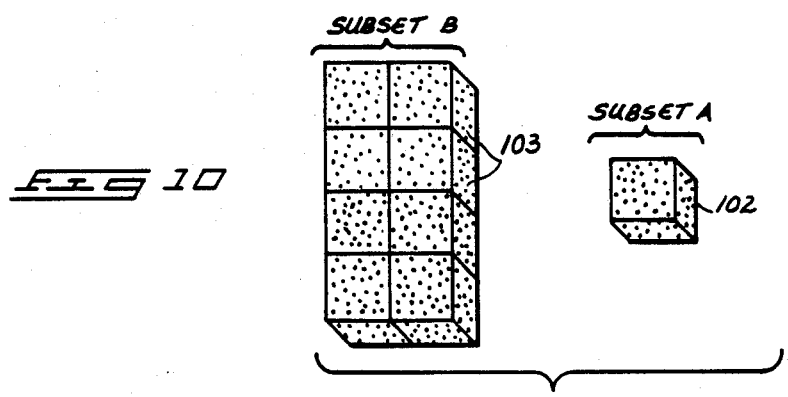
FIG. 10 is a perspective view of a set similar to that shown in FIG. 8 with the variable x set equal to 4.

In compliance with the constitutional purpose of the Patent Laws "to promote the progress of science and useful arts" (Article 1, Section 8), applicant submits the following disclosure of the invention.

The present invention includes methods for structurally performing mathematical differentiation of polynomial functions. These methods can be practiced using a variety of parallelogrammic structural elements. FIG. 1 shows a parallelogrammic structural element 30 having a top face 31 and bottom face 32. Element 30 is a rectangular unit element indicated by top and bottom faces 31 and 32 being square and of an arbitrarily determined dimension k across the top and bottom faces.

Element 30 also has a thickness t which is arbitrary and irrelevant when element 30 is used as a two-dimensional representation. Thickness t can be significant when the element is being used as a three-dimensional representation as explained fully below. The thickness t of structural elements used in a two-dimensional representation is preferably sufficient to allow easy manipulation but can theoretically be infinitesimally thin.

FIGS. 2A and 2B show an alternative parallelogrammic structural element 40 shown in top and side view, respectively. FIG. 2A shows that element 40 is an oblique parallelogram having a top surface 41 and bottom surface 42 with side edges 43 which are all of length j which is advantageously defined as the unit length, or some other appropriate scale.

FIG. 3 shows a further alternative parallelogrammic unit element 50 which is used to provide three-dimensional representation for use in methods of this invention. Element 50 is advantageously a cube provided with dimensions h along all sides, which can advantageously be defined as equal 1 unit or other appropriate scale factor.

FIGS. 4A and 4B shows a further alternative parallelogrammic structural element 60 useful in methods according to this invention. Element 60 is rectangular having a top face 61 and a bottom face 62. Top and bottom faces 61 and 62 are advantageously sized such that the end edges 63 and 64 have a length a which has arbitrarily been selected to represent a unit. Front and back edges 65 and 66 have lengths of dimension b which have conveniently been sized to equal 3 times a. Element 60 thus has a value for purposes of this invention represented by the product of one side times an adjacent side, or the value three, as represented in FIG. 4A. This value and similar computations are herein termed the parallelogrammic value. When the parallelogrammic elements are rectangular, the parallelogrammic value will be directly indicated by the area or volume of the relevant two-dimensional or three-dimensional element. When the structural elements are oblique, then the area will not equal the parallelogrammic value defined by the product of the adjacent relevant side lengths.

FIGS. 5A and 5B show a further alternative structural element 70 in top and side elevational view, respectively. Element 70 has top and bottom surfaces 71 and 72 which are oblique parallelograms. The end faces 73 and 74 have lengths which are equal to each other and are defined as a unit length. Front and back faces 75 and 76 have lengths equal to four times the lengths of end faces 73 and 74, thus rending element 70 with a parallelogrammic value equal to four (4). The parallelogrammic value is preferably indicated by division lines 77 painted or otherwise indicated on element 70 for immediate recognition of the number of parallelogrammic units.

FIG. 6 shows a further type of parallelogrammic structural element 80 for use in methods of this invention. Element 80 has advantageously been formed with a width c which is arbitrarily set at unity. The length is indicated by the letter X thus implying that the actual length is merely for convenience and that the value X represents an undesignated length of the independent variable, x, of the particular polynomial function being solved.

FIGS. 7A and 7B are a top view and front elevational view, respectively, of a further alternative structural element 90 useful in the methods of this invention. Structural element 90 has top and bottom planar surfaces 91 and 92 which are oblique parallelograms having an oblique angle $q_1$ defined between the front face 93 and the left end face 94. The width of the top face 91 is defined by dimension g which has been arbitrarily assigned a value of two (2) units as indicated on FIG. 7A. An indicator line 95 is painted or otherwise visually indicated upon top face 91 in order to give the user immediate visual recognition of the width value. The length X is used as an indicator of an undesignated value for the variable x of the polynomial function. A specific value can also be attributed to the variable x.

Methods according to this invention use parallelogrammic structural elements such as indicated above, or an infinite variety of obvious variations thereof. The structural elements allow the known polynomial function to be expressed in a structural representation thereof. The structural elements are used to create two or more different sets showing two or more structural representations of the polynomial function. The derivative or change of the function as a result of a known change in the independent variable can then be ascertained by comparison of the two or more sets of structural representations. Thus, this invention provides mechanical methods using structural elements to provide a clear indication of the differential of the polynomial being differentiated.

FIGS. 8 and 9 show a structural representation of a linear polynomial function of the form $f(x)=2x+1$. The set of FIG. 8 includes a type of subset indicated as subset A which includes all numerical or constant values in the function not dependent upon the independent variable x. Subset B indicates the structural elements used to represent the first order component of the polynomial which is a function of the first power of the independent variable.

The set of FIG. 8 shows a first order subset A having a single parallelogrammic structural element 100 having a parallelogrammic value equal to 1. Subset B of FIG. 8 shows a first order component 108 having a width of two units and an undesignated length indicated by an appropriate arbitrary length X, which is used to represent an undesignated value of the variable x. The parallelogrammic value of subset B of FIG. 8 is the product of the adjacent or intersecting sides of the parallelograms being used, or in this case, 2X. The function represented by FIG. 8 can thus be easily recognized as $f(x)=2X+1$.

FIG. 9 shows a second structural representation of the function $f(x)=2x+1$ where x has been increased by an incremental unquantified amount DX thus equaling X+DX. This is accomplished structurally by adding structural element 109 having length DX and width 2. The result is to add an incremental amount of parallelogrammic value to the representation of the total function. Subset A is not changed because it is a constant and does not vary with changes in the value of x. Subset B has an increased parallelogrammic value represented by the product of the change in x which is the amount DX, times the width, 2. Thus, the function 2x+1 increases by 2DX when x increases by the amount DX.

The differential of a function is generally accepted as the rate of change in the total function as a result of a change in the independent variable. This is equal to the change in the total function divided by the associated change in the independent variable. In the example just described, the differential thus is the change in the function, 2DX, divided by the associate change in x, or DX, thus giving the answer 2. This answer is also expected using traditional nonstructural techniques for differentiating polynomial functions.

Figure 11:
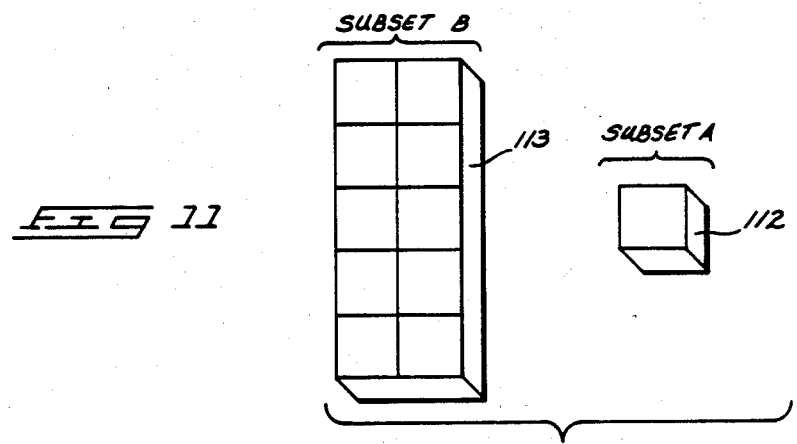
FIG. 11 is a perspective view of a set similar to that shown in FIG. 8 with the variable x set equal to 5.
Figure 12:
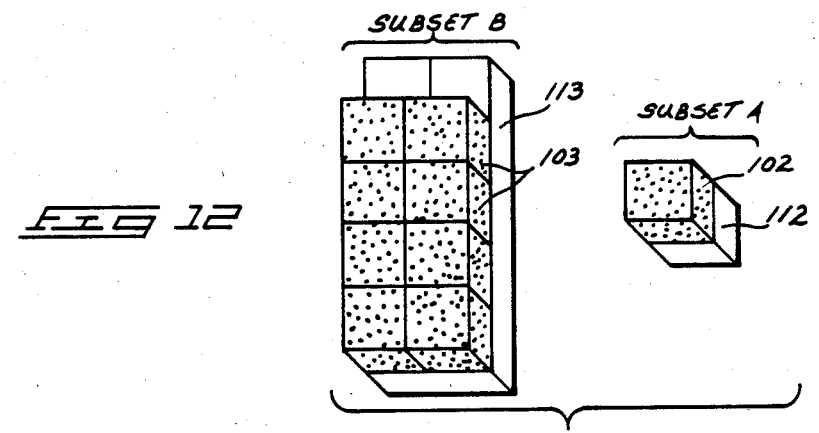
FIG. 12 is a perspective view of the set shown in FIG. 10 overlying the set shown in FIG. 11 in order to compare and show the differences therebetween.

FIGS. 10-12 illustrate methods according to this invention in the context of specific values for the variable of the function. Again the mathematical function involved is $f(x)=2x+1$ as used above. In FIG. 10 the value of x has been set equal to 4. The set of FIG. 10 includes a subset A having a two-dimensionally representative unit element 102. The set further includes a construction of unit elements 103 arranged into subset B, a parallelogrammic construction having a width of 2 and a length of 4. Subset B thus has 8 parallelogrammic units. The total value of the set of FIG. 10 is $8+1=9$. The set of FIG. 10 can also be mathematically represented in the form of an ordered pair (x, f(x)) or (4, 9).

FIG. 11 represents the same mathematical function $f(x)=2x+1$ but with x set equal to 5. The set of FIG. 11 includes a subset A having a two-dimensionally representative unit element 112. The set further includes a single composite element 113 having a width 2 and a length of 5. Subset B represents the first order term 2x where x equals 5. Subset B thus has a parallelogrammic value of 2 times 5 or 10. The total value of the function represented in FIG. 11 is $10+1=11$. The set of FIG. 11 can also be represented in the form of an ordered pair (x, f(x)) or (5, 11).

Methods of this invention are practiced by structurally representing the quantified or unquantified value of the function at two or more points and comparing the sets to determine the structural differences which have occurred for a given change in the variable of the function. FIGS. 10 and 11 show construction of structural representations of the function $f(x)=2x+1$, when $x=4$ and $x=5$, respectively. FIG. 12 illustrates a convenient method for comparing the structural differences between the sets of FIGS. 10 and 11 by overlaying the individual structural elements 103 of subset B on top of the composite element 113. Individual element 102 is also overlaid on top of element 112. FIG. 12 clearly indicates that the parallelogrammic value of subset A does not change even though the value of x has changed from 4 to 5. Subset B, however, does change as shown by the 2 additional parallelogrammic unit squares associated with subset B of FIG. 11 as compared to subset B of FIG. 10. Thus, the practitioner of the inventive method clearly identifies that a change of 2 units has occurred as a result of a change of 1 in the value of x. This clearly identifies that the rate of change or differential is equal to 2 divided by 1 or 2.

Figure 13:
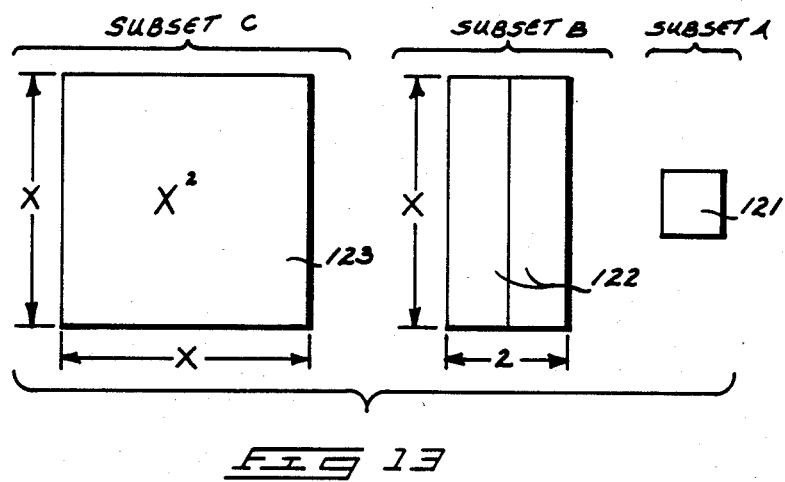
FIG. 13 is a top view of a set of parallelogrammic structural elements arranged to structurally represent the function $f(x) = x^2 + 2x + 1$; the variable x has arbitrarily been assigned the value X, indicating an undesignated length.
Figure 14:
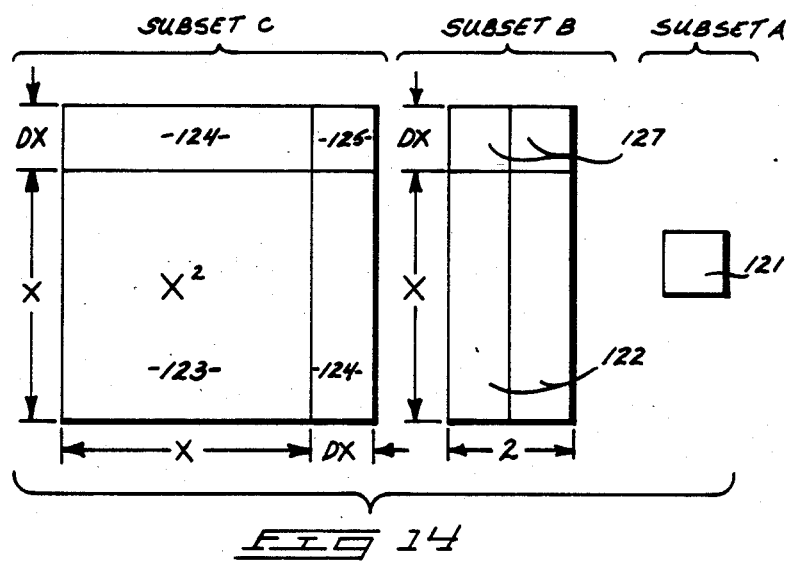
FIG. 14 is a top view of the set of FIG. 13 with additional parallelogrammic structural elements arranged to structurally represent the addition of an incremental amount DX to the value of x, such that $x = X + DX$.

FIGS. 13 and 14 show two different representations of the second order polynomial function $f(x)=x^2+2x+1$. The set constructed for FIG. 13 includes subsets A, B and C for categorized representation of the constant, first order terms, and second order terms, respectively. Subset A includes a single unit square 121 representative of the constant quantity 1 of the function. Subset B structurally represents the first order factor of the polynomial and advantageously includes two rectangular structural elements 122 each having a width equal to 1 unit, and a length equal to some arbitrary length X which represents the undesignated value of variable x.

Subset C includes a single element 123 which is square and has equal length and width X which are arbitrary and undesignated to represent the variable value $x^2$. It is preferable but not necessary that the X dimension of subset C be the same as the X dimension of subset B of the same set. The elements 121-123 can be relatively thick or thin depending upon the desired construction since all representation of the second order function occurs effectively in a single plane and depth is not needed to represent other parameters.

FIG. 14 is a further representation of the function $f(x)=x^2+2x+1$ wherein the value of the variable x is increased by an arbitrary incremental amount DX thus equalizing X+DX. The change of x to X+DX can be structurally represented in subset C by the addition of two side elements 124 having length X and width DX. These elements are arranged as shown in FIG. 14 with respect to the $X^2$ element 123. A further square element 125 having sides equal to DX is positioned as shown to complete the new square having sides X+DX in length.

Subset B of FIG. 14 must also be changed in order to properly represent the new value X+DX. This can be represented by adding two incremental units 127 as indicated, each having width equal to 1 and length of DX. The resulting subset B of FIG. 14 has a changed parallelogrammic value as does subset C. Subset A does not change between the constructions of FIGS. 13 and 14 because of its constant value of 1.

The methods of this invention require comparison of the sets of FIGS. 13 and 14 to ascertain the total difference in parallelogrammic value associated with the change in the variable from X to X+DX. The associated changes are easily identified by the structural elements 124, 125 and 127 which were necessarily added to properly represent the new value of f(X+DX). The additions can be mathematically identified as two parallelogrammic values XDX for each element 124, and $DX^2$ for element 125. Elements 127 have parallelogrammic value of 2DX. Totalling these factors we find a total difference of $2X \cdot DX + 2DX + DX^2$. This can be related to traditional mathematically derived answers for the differential by dividing each factor by the change in the independent variable DX, thus producing a differential equal to $2X+2+DX$. This clearly illustrates that traditional answers for the differential $2x+2$ ignore the incremental component DX which is very small in the limit as DX is set very close to zero, a typical assumption used in differential calculus.

Figure 15:
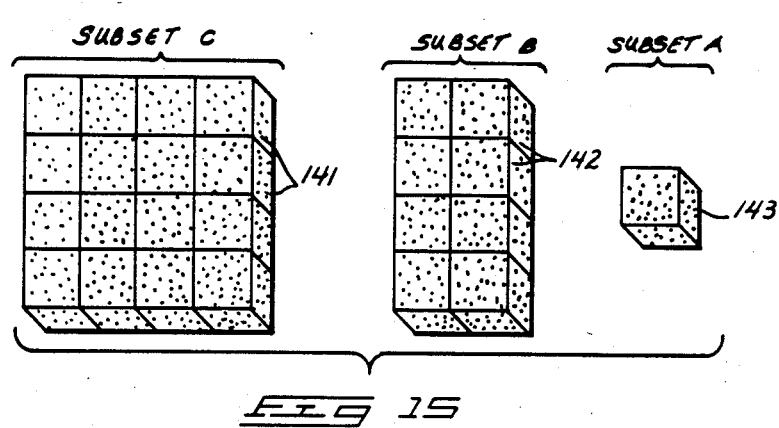
FIG. 15 is a perspective view showing a set of parallelogrammic structural elements arranged to represent the function $f(x) = x^2 + 2x + 1$ with x defined as equal to 4.
Figure 16:
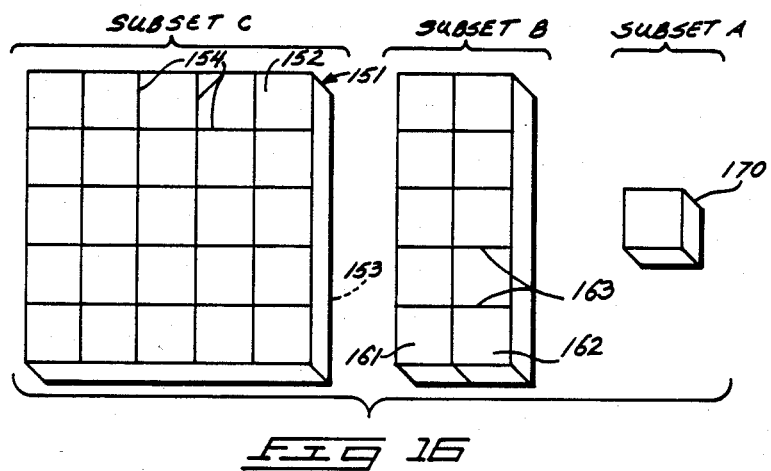
FIG. 16 is a perspective view showing a set of parallelogrammic structural elements arranged to represent the function $f(x) = x^2 + 2x + 1$ with x defined as equal to 5.
Figure 17:
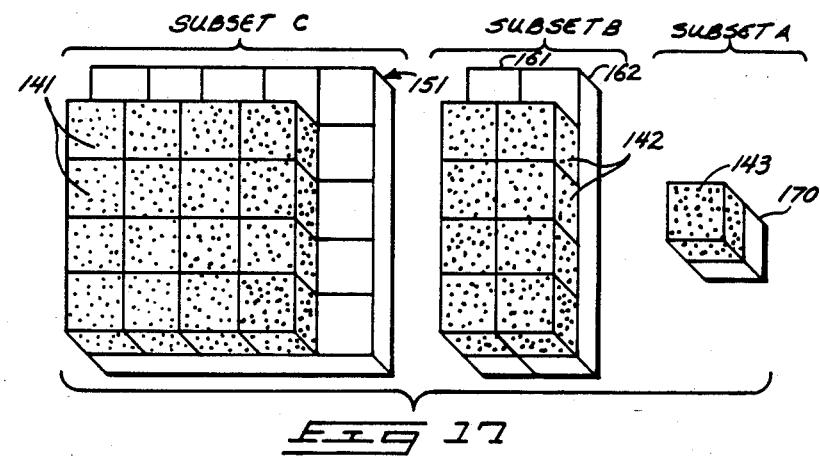
FIG. 17 is a perspective view showing the set of FIG. 15 overlayed upon the set of FIG. 16 for easy comparison of the differences between said sets.

FIGS. 15-17 show the practice of methods according to this invention in the context of a second degree polynomial function being analyzed at two different specific values of x. FIG. 15 is a set of parallelogrammic elements representing the second order polynomial function $f(x)=x^2+2x+1$ when x is set equal to 4. The set of FIG. 15 can be constructed in any convenient manner from the wide variety of parallelogrammic structural elements useful in practicing this invention. Subset C represents the second order term and is shown constructed of a plurality of unit squares 141 with sixteen such unit squares arranged into a square construction four units in both length and width. Subset B of FIG. 15 representing the first order term is similarly constructed of unit square elements 142 arranged into a construction 4 units long and 2 units wide. Subset A is a constant containing 1 square unit element 143.

FIG. 16 is a set of parallelogrammic elements representing the same second order polynomial function used in the construction of FIG. 15 except the variable x is set equal to 5. Second order subset C of FIG. 15 can advantageously be constructed using a single element 151 having top and bottom surfaces 152 and 153, respectively. Top and bottom surfaces 152 and 153 are shaped as squares having sides of length corresponding to 5 units, as determined by the size of parallelogrammic elements being used for subset C of FIG. 15. Element 151 has advantageously been marked with lines 154 to provide easy visual recognition of the number of parallelogrammic units being represented thereby. Further indicia such as arabic numerals (not shown) could also be applied to the element to provide further ease of use.

Subset B of FIG. 16 is advantageously constructed using two rectangular parallelogrammic elements 161 and 162. Elements 161 and 162 are similar, each having a unit width and 5 units length. The plurality of length units represented by elements 161 and 162 are clearly displayed by including painted or printed division lines 163 at appropriate locations across the elements. Elements 161 and 162 are arranged together to produce a first order construction having one side equal to 2 units and the other side equal to 5, the value of the variable x.

Subset A of FIG. 16 is constructed using an element 170 having top and bottom surfaces which are a unit square.

Methods of this invention include comparisons of the sets representing two or more ordered pairs of the same polynomial equation. FIG. 15 represents the first ordered pair (4, 25) which can be understood since the variable x is equal to 4 and the total value of the function $f(x)=x^2+2x+1$ is equal to 25 when x is equal to 4. This can also be ascertained by the total number of parallelogrammic units in the set of FIG. 15. A second ordered pair representative of this function and the construction of FIG. 16 is (5,36). The total number of parallelogrammic units in the set of FIG. 16 corresponds to the second value of the ordered pair. The first value of the ordered pair corresponds to the value of the variable x for the set in question.

FIG. 17 shows one advantageous procedure for comparing the sets of FIGS. 15 and 16. This is done by separately overlaying the subsets A, B and C of FIG. 15 onto the respective subsets of FIG. 16. Visual examination of the resulting composite construction allows ready observation that there is a difference of 9 parallelogrammic units in subset C. Subset B has a difference of 2 parallelogrammic units. Subset A is constant in each set and there is no difference between the sets of FIGS. 15 and 16. The total difference is thus 9+2 or 11 units, as a result of a change in the variable x of 5−4 or 1 unit. Thus the differential of this polynomial function between x equal to 4 and x equal to 5 is 11.

Comparison with the traditional method indicates that the polynomial $f(x)=x^2+2x+1$ would first be differentiated to produce $f(x)=2x+2$. The value of f(x) at x=4 is 10. The value of f(x) at x=5 is 12. The average value is thus 11 which compares to the result actually obtained using a method according to this invention.

Figure 18:
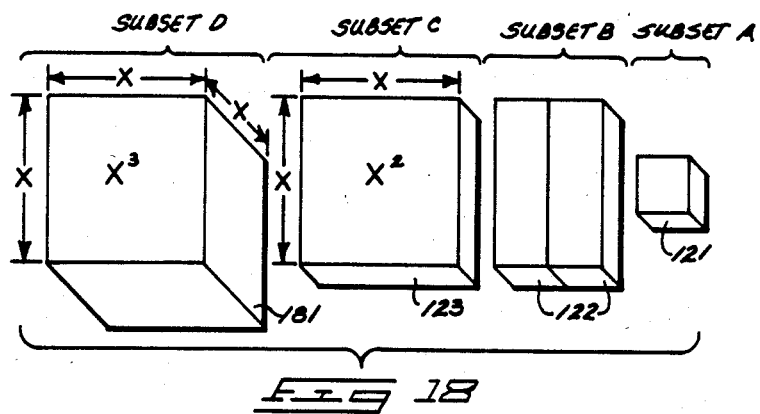
FIG. 18 is a perspective view showing a set of parallelogrammic structural elements arranged to structurally represent the function $f(x) = x^3 + x^2 + 2x + 1$; the variable x has arbitrarily been assigned the value X, indicating an undesignated length.

FIG. 18 shows a further construction of parallelogrammic elements representative of a third degree or third order polynomial function $f(x)=x^3+x^2+2x+1$. The set of elements shown in FIG. 18 includes subsets A, B and C which are essentially as described with respect to FIG. 13. The set of FIG. 18 further includes a third order subset D which represents the third order factor(s) of the polynomial. The third order subset D preferably includes one or more three-dimensional parallelogrammic structural elements, such as 181 shown in FIG. 18. Element 181 is constructed with equal side edges of a length useful for representing a specific value or illustrative of an undefined value X, as shown in FIG. 18. The dimension X is preferably similar to those used for the elements of subsets B and C of FIG. 18.

An incremental amount such as DX can also be added and explained with respect to the third order polynomial represented by FIG. 18. However, such a development is clearly obvious from the prior discussion in connection with FIGS. 8, 9, 13 and 14, and from the following explanation of structural differentiation of third order polynomial functions using specific values of the variable, x.

Figure 19:
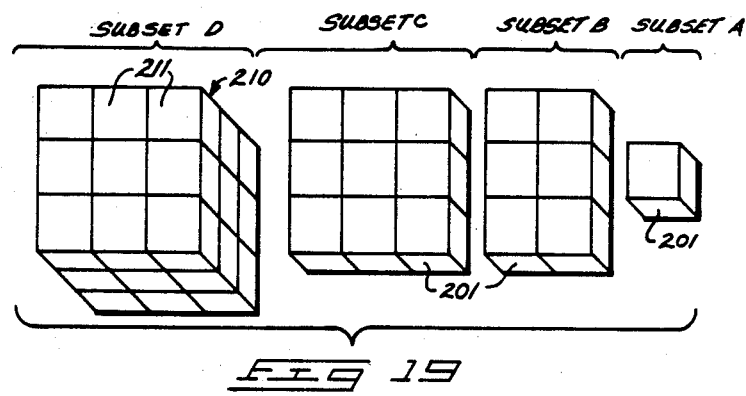
FIG. 19 is a perspective view showing a set of parallelogrammic structural elements arranged to represent the function $f(x) = x^3 + x^2 + 2x + 1$ with the variable x defined as equal to 3.

FIG. 19 shows a set of parallelogrammic structural elements representative of a third order polynomial function, $f(x)=x^3+x^2+2x+1$, where x is equal to 3. Subsets A, B and C are advantageously constructed using a plurality of three-dimensional unit elements 201 similar to element 50 described hereinabove. Subset A contains a single such element. Subset B contains a construction of six such elements to produce a rectangular construction 2 units wide by 3 units long. Subset C contains a construction forming a square of 3 units along each side.

FIG. 19 also shows a subset D having a three-dimensionally representative parallelogrammic construction 210. Construction 210 advantageously is formed of 27 distinct structural cubes 211 arranged into a cubic form having edges of 3 units in length. The total parallelogrammic value associated with the set of FIG. 19 can be ascertained by computing the total parallelogrammic units present. The third order subset containing cube 210 has 27 parallelogrammic units. The second order subset contains 3 times 3 or 9 parallelogrammic units. The first order subset contains 2 times 3 or 6 parallelogrammic units. And the constant of 1 is also counted to produce a total function value of 43 parallelogrammic units.

Checking against the mathematical expression confirms the representative relationship of each factor and the total number of 43. The set of FIG. 19 can also be represented by an ordered pair in the form (x, f(x)) which in this case is (3, 43).

Figure 20:
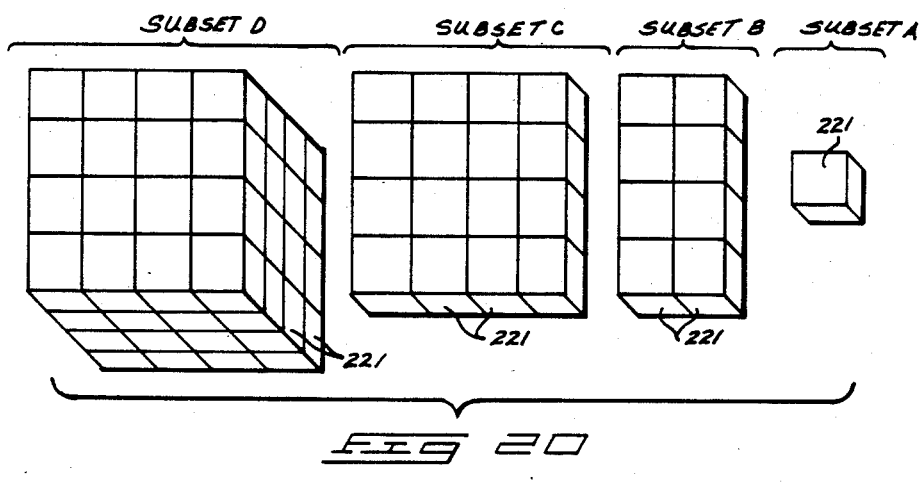
FIG. 20 is a perspective view showing a set of parallelogrammic structural elements arranged to represent the function $f(x)=x^3+x^2+2x+1$ with the variable x defined as equal to 4.

FIG. 20 also shows a set of parallelogrammic structural elements representative of the same third order polynomial function, $f(x)=x^3+x^2+2x+1$, where x is equal to 4. Subsets A, B and C are constructed of suitable parallelogrammic elements such as described hereinabove or using alternative elements of suitable form. Subset A advantageously includes a unit square or cube 221, representing the constant value 1. Subset B includes a plurality of unit cubes 221 which are arranged into a rectangular array 2 units wide by 4 units long representing the value associated with the first order component, 2x, of the stated polynomial function. Subset C is advantageously made from 16 similar unit cubes 221 which are arranged into a square array 4 units along each side.

Subset D represents the third order factor of the polynomial function which is advantageously constructed in a three-dimensionally representative form having edges all being the value of x, namely, 4. This is advantageously accomplished using 64 unit cubes 221 stacked into the cubic array. It is also possible for the third order factor to be graphically separated and spread out for easier counting and understanding, such as by arranging each layer of the cubic form separately upon the surface of a table or the like.

Methods of this invention are useful for computing the average derivative of the polynomial function between the values of x equal to 3 and 4. The sets of FIGS. 19 and 20 are first constructed as previously explained. The set of FIG. 19 is then compared to the set of FIG. 20 and the differences in parallelogrammic value are then identified. In the example at hand, the third order factors represented by subsets D are different by the amount of 64 less 27 which equals 37. The second order factors differ by the amount of 16 less 9 which equals 7. The first order factors differ by the amount of 8 less 6 which equals 2. The total difference between the value of the polynomial function can thus be ascertained by counting the structural elements or their equivalent parallelogrammic value. In this case there is a total difference of 46 which results from a unit change in the variable, x. Thus, the average differential is 46 over the range of values x equal 4 to 5.

The multiplicative coefficients of the first, second and third order terms of a polynomial are advantageously represented by using multiple structural elements. This has been described and illustrated above with respect to first order subsets such as by the use of two elements 161 and 162 in FIG. 16. Similar multiples or fractional portions of second and third order structural constructions can be used to represent integer or fractional second and third coefficients of the polynomical function.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A method for structurally differentiating between a plurality of ordered pairs of values, each ordered pair having a first value and a second value, the second value of each pair being a first degree polynomial function dependent upon said first value; said method using a plurality of parallelogrammic structural elements which are manipulated to provide a readily observable indication of the derivative being sought; the parallelogrammic structural elements having associated parallelogrammic values indicated by the size of the parallelogrammic structural elements; the method comprising:

constructing a first set of parallelogrammic structural elements repesentative of a first ordered pair; said first set including a first order subset having at least one parallelogrammic first order structure having a first side with a first order dimension representing the first value of said first ordered pair, and having a second side equal to a first order coefficient of said polynomial function;

further constructing said first set to include any constant subset having parallelogrammic elements with parallelogrammic value equal to a constant amount defined by said polynomial function;

constructing a second set of parallelogrammic structural elements representative of a second ordered pair; said second set including at least one first order element having a first side with a first order dimension representing the first value of said first ordered pair, and having a second side with a length representative of a first order coefficient of said polynomial function;

further constructing said second set to include any constant portion having parallelogrammic elements with parallelogrammic value equal to a constant amount defined by said polynomial function; and comparing said second set to said first set to provide a structural indication of the total differences between the first and second sets occurring as a result of the difference between the first value of the first ordered pair and the first value of the second ordered pair, thus indicating the differential of said polynomial function.

2. The method of claim 1 wherein the parallelogrammic structural elements are rectangular.

3. A method for structurally differentiating between a plurality of ordered pairs of values, each ordered pair having a first value and a second value, the second value of each pair being a second degree polynomial function dependent upon said first value; said method using a plurality of parallelogrammic structural elements which are manipulated to provide a readily observable indication of the derivative being sought; the parallelogrammic structural elements having associated parallelogrammic values indicated by the size of the parallelogrammic structural elements; the method comprising:

constructing a first set of parallelogrammic structural elements representative of a first ordered pair; said first set including a second order subset having at least one parallelogrammic second order structure having a second order dimension along two adjacent intersecting parallelogrammic sides of equal length; said second order dimension being representative of the first value of the first ordered pair;

further constructing said first set to include any first order subset having any parallelogrammic first order structures each having a first side equal in length to a first order dimension representative of the first value of said first ordered pair, and having a second side, adjacent to the first side thereof, equal in length to a second dimension representative of a first order coefficient of said second degree polynomial;

still further constructing said first set to include any constant subset having parallelogrammic elements with parallelogrammic value equal to a constant value defined by any constant amount of said polynomial function;

constructing a second set of parallelogrammic elements representative of a second ordered pair; said second set including a second order subset having at least one parallelogrammic second order structure having a second order dimension along two adjacent parallelogrammic sides of equal length; said second order dimension being representative of the first value of said second ordered pair;

further constructing said second set to include any first order subset having any parallelogrammic first order structures each having a first side equal in length to a first order dimension representative of the first value of said second ordered pair, and having a second side, adjacent to the first side thereof, having a length representative of a first order coefficient defined by said polynomial function;

still further constructing said second set to include any constant subset having parallelogrammic elements with parallelogrammic value equal to a constant value defined by any constant amount of said second degree polynomial function; and comparing said second set to said first set to provide a structural indication of the total differences between the first and second sets occurring as a result of the difference between the first value of the first ordered pair and the first value of the second ordered pair, thus indicating the differential of said polynomial equation.

4. The method of claim 3 wherein the parallelogrammic structural elements are rectangular and the subset structures constructed therefrom are also rectangular.

5. The method of claim 3 wherein the step of comparing involves individually comparing the respective second order, first order and constant subsets of the first and second sets of structural elements.

6. A method for structurally differentiating between a plurality of ordered pairs of values, each ordered pair having a first value and a second value, the second value being a third degree polynomial function dependent upon said first value; said method using a plurality of parallelogrammic structural elements which are manipulated to provide a readily observable indication of the derivative being sought; the parallelogrammic structural elements having associated parallelogrammic values indicated by the size of the parallelogrammic structural elements, the method comprising:

constructing a first set of parallelogrammic elements representative of a first ordered pair defined by said polynomial function; said first set including a third order subset having at least one parallelogrammic third order structure having a third order dimension representative of the first value of the first ordered pair;

further constructing said first set to include any second order subset having any parallelogrammic second order structures each such second order structures having a second order dimension along two adjacent intersecting parallelogrammic sides of equal length; said second order dimension being representative of the first value of said first ordered pair;

further constructing said first set to include any first order subset having any first order structures each having a first side equal in length to a first order dimensional representative of the first value of said first ordered pair, and having a second side, adjacent to said first side thereof, equal in length to a second dimension representative of a first order coefficient of said polynomial function;

still further constructing said first set to include any constant subset having parallelogrammic elements with parallelogrammic value equal to a constant value defined by a constant amount of said polynomial function;

constructing a second set of parallelogrammic elements representative of a second ordered pair of values defined by said polynomial function; said second set including a third order subset having at least one parallelogrammic third order structure having a third order dimension representative of the first value of the second ordered pair;

further constructing said second set to include any second order subset having any parallelogrammic second order sturctures each having a second order dimension along two adjacent intersecting parallelogrammic sides; said second order dimension being representative of the first value of said second ordered pair;

further constructing said second set to include any first order subset having any parallelogrammic first order structures each having a first side equal in length to a first order dimension representative of the first value of said second ordered pair, and having a second side, adjacent to the first side thereof, having a length representative of a first order coefficient defined by said polynomial function;

still further constructing said second set to include any constant subset having parallelogrammic elements with parallelogrammic value equal to a constant amount defined by said polynomial functions; and comparing said second set to said first set to provide a structural indication of the total difference between the first and second sets occurring as a result of the difference between the first value of the first ordered pair and the first value of the second ordered pair, thus indicating the differential of said polynomial function.

7. The method of claim 6 wherein the parallelogrammic structural elements are rectangular and the subset structures constructed therefrom are also rectangular.

8. The method of claim 6 wherein the step of comparing involves individually comparing the respective third order, second order, first order and constant subsets of the first and second sets of structural elements.

* * * * *